United States Patent
Rajagopalan

(10) Patent No.: US 7,391,190 B1
(45) Date of Patent: Jun. 24, 2008

(54) APPARATUS AND METHOD FOR THREE-PHASE BUCK-BOOST REGULATION

(75) Inventor: Jayendar Rajagopalan, Newcastle, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 63 days.

(21) Appl. No.: 11/397,588

(22) Filed: Apr. 3, 2006

(51) Int. Cl.
*G05F 1/59* (2006.01)
(52) U.S. Cl. .................. 323/271; 323/225; 323/283
(58) Field of Classification Search ............... 323/222, 323/225, 271, 283
See application file for complete search history.

(56) References Cited

U.S. PATENT DOCUMENTS

| | | | | |
|---|---|---|---|---|
| 4,736,151 | A * | 4/1988 | Dishner | 323/224 |
| 4,801,859 | A * | 1/1989 | Dishner | 323/224 |
| 4,974,141 | A * | 11/1990 | Severinsky et al. | 363/81 |
| 5,831,418 | A * | 11/1998 | Kitagawa | 323/222 |
| 6,087,816 | A * | 7/2000 | Volk | 323/282 |
| 6,166,527 | A * | 12/2000 | Dwelley et al. | 323/222 |
| 6,215,286 | B1 * | 4/2001 | Scoones et al. | 323/222 |
| 6,275,016 | B1 * | 8/2001 | Ivanov | 323/224 |
| 6,348,779 | B1 * | 2/2002 | Sluijs | 323/222 |
| 6,348,781 | B1 * | 2/2002 | Midya et al. | 323/224 |
| 6,515,457 | B1 | 2/2003 | Maniktala | |
| 6,788,033 | B2 * | 9/2004 | Vinciarelli | 323/225 |
| 6,812,676 | B2 * | 11/2004 | Tateishi | 323/225 |
| 6,958,595 | B2 * | 10/2005 | Niiyama et al. | 323/282 |
| 6,984,967 | B2 * | 1/2006 | Notman | 323/282 |
| 7,116,085 | B2 * | 10/2006 | Ikezawa | 323/225 |
| 7,135,843 | B2 * | 11/2006 | Ikezawa | 323/282 |
| 7,157,888 | B2 * | 1/2007 | Chen et al. | 323/224 |
| 7,176,667 | B2 * | 2/2007 | Chen et al. | 323/282 |
| 7,202,644 | B2 * | 4/2007 | Nitta et al. | 323/259 |
| 7,248,030 | B2 * | 7/2007 | Yoshino | 323/284 |
| 7,268,525 | B2 * | 9/2007 | Ishii et al. | 323/282 |

OTHER PUBLICATIONS

LTC3440 Data Sheet, "Micropower Synchronous Buck-Boost DC/DC Converter," Linear Technology Corporation (2001).
Chen et al., "Buck-Boost PWM Converters Having Two Independently Controlled Switches," 2001 IEEE 32nd Annual Power Electronics Specialists Conference (PESC), 2(17-21):736-741 (2001).

(Continued)

*Primary Examiner*—Jeffrey L Sterrett
(74) *Attorney, Agent, or Firm*—Darby & Darby PC; Matthew M. Gaffney

(57) ABSTRACT

A buck-boost converter is provided. In buck-boost mode, the converter operates in at least three phases. In one phase, the inductor current ramps upward. In another phase, the inductor current ramps downward. In yet another phase, the inductor current remains at roughly the same non-zero value. Only one pulse-width modulating signal is used in the buck-boost operation. A PWM comparator compares the pulse-width modulating signal with the error signal and trips when the error signal exceeds the pulse-width modulating signal. One of the three phases occurs at the beginning of the clock pulse before the PWM comparator trips. Another of the phases occurs while the PWM comparator is tripped. Yet another of the phases occurs from the time that the PWM goes from tripped to untripped until the beginning of the next clock cycle.

20 Claims, 5 Drawing Sheets

OTHER PUBLICATIONS

Cheng et al., "Chaos Study and Parameter-Space Analysis of the DC-DC Buck-Boost Converter," IEE Proc.-Electr. Power Appl., 150(2):126-138 (2003).

Feng et al., "An Adaptive Current Mode Fuzzy Logic Controller for DC-to-DC Converters," 2003 IEEE Applied Power Electronics Conference (APEC), pp. 983-989 (2003).

Gaboriault et al., "A High Efficiency, Non-Inverting, Buck-Boost DC-DC Converter," 2004 19th Annual IEEE Applied Power Electronics Conference and Exposition (APEC '04), 3:1411-1415 (2004).

Midya et al., "Tracking Power Converter for Supply Modulation of RF Power Amplifiers," 2001 IEEE 32nd Annual Power Electronics Specialists Conference (PESC), 3(17-21):1540-1545 (2001).

Midya et al., "Buck or Boost Tracking Power Converter," IEEE Power Electronics Letters, 2(4):131-134 (2004).

Nguyen et al., "A Tracking Control Method for Boost and Buck-Boost Converters Using Input Current Prediction and Load Current Feedforward," 1997 28th Annual IEEE Power Electronics Specialists Conference (PESC), 1(22-27):189-196 (1997).

Rogers, E., "Understanding Buck-Boost Power Stages in Switch Mode Power Supplies," Texas Instruments, Application Report, SLUA059A, pp. 1-32 (2002).

Sahu et al., "A High-Efficiency Linear RF Power Amplifier with a Power-Tracking Dynamically Adaptive Buck-Boost Supply," IEEE Transactions on Microwave Theory and Techniques, 52(1):112-120 (2004).

Sahu et al., "A Low Voltage, Dynamic, Noninverting, Synchronous Buck-Boost Converter for Portable Applications," IEEE Transactions on Power Electronics, 19(2):443-452 (2004).

Liqing et al., "Computation of Lyapunov Exponents for a Current-Programmed Buck-Boost Converter," 2nd International Workshop on Autonomous Decentralized System, 6-7:273-276 (2002).

* cited by examiner

APPARATUS AND METHOD FOR THREE-PHASE BUCK-BOOST REGULATION

FIELD OF THE INVENTION

The invention is related to converters, and in particular, to an apparatus and method for a DC-DC converter in which buck-boost operation is performed with one pulse-width modulating signal and at least three phases.

BACKGROUND OF THE INVENTION

A buck regulator may be used to generate a regulated output voltage than is less than the input voltage; conversely, a boost converter may be used to generate a regulated output voltage that is greater than the input voltage. However, DC-DC converters with step up/step down characteristics need to be used when the input and output voltage ranges overlap. For example, a DC-DC converter may be used to converte a voltage from a battery, which may have a voltage from 4.5V to 2.5V, into an output voltage of 3.4 V to 0.8 V. Several different topologies may be used, such as SEPIC, Cuk, a buck/boost regulator, and the like.

Brief Description of the Drawings

Non-limiting and non-exhaustive embodiments of the present invention are described with reference to the following drawings, in which.

DETAILED DESCRIPTION

Figure 1:
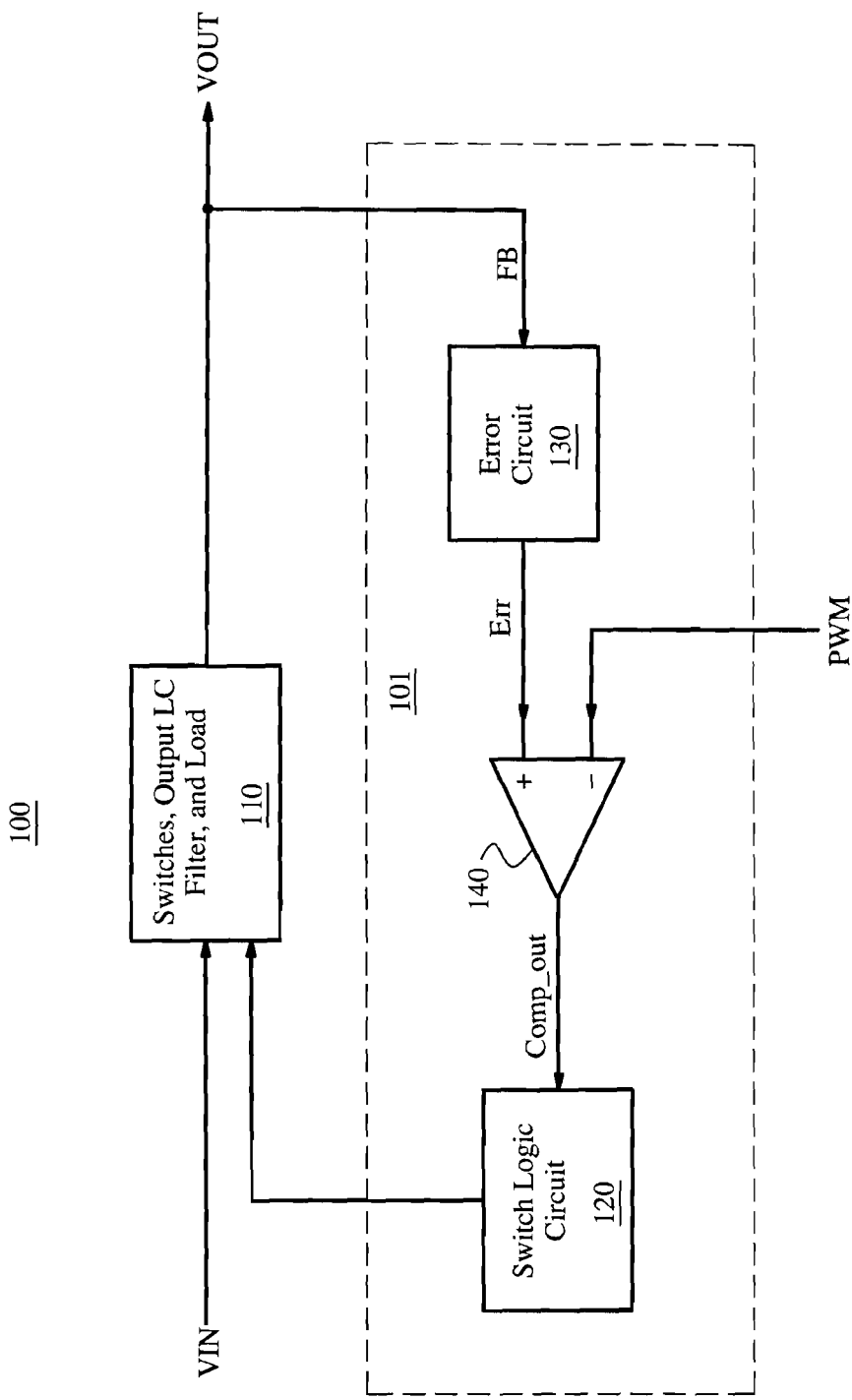
FIG. 1 illustrates a block diagram of a converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a buck-boost converter. In buck-boost mode, the converter operates in at least three phases. In one phase, the inductor current ramps upward. In another phase, the inductor current ramps downward. In yet another phase, the inductor current remains at roughly the same non-zero value. Only one pulse-width modulating signal is used in the buck-boost operation. A PWM comparator compares the pulse-width modulating signal with the error signal and trips when the error signal exceeds the pulse-width modulating signal. One of the three phases occurs at the beginning of the clock pulse before the PWM comparator trips. Another of the phases occurs while the PWM comparator is tripped. Yet another of the phases occurs from the time that the PWM goes from tripped to untripped until the beginning of the next clock cycle.

FIG. 1 illustrates a block diagram of an embodiment of converter 100. Converter 100 includes regulator controller 101 and block 110. Block 110 may include switches, an output LC filter, a load, and/or the like. Regulator 101 includes error circuit 130, PWM comparator 140, and switch logic circuit 120.

In operation, error circuit 130 provides error signal Err based, in part, on feedback signal FB. Feedback signal FB is based, at least in part, on output voltage VOUT and/or a load current associated with block 110.

Additionally, PWM comparator 140 is operable to compare pulse-width modulating signal PWM with error signal ERR, and to provide comparator output signal Comp_out based on the comparison.

Further, Switch logic circuit 120 is operable to control switches in block 110 based, in part, on signal Comp_out to control regulation of output voltage VOUT. In one embodiment, the regulation is always performed in buck-boost mode. In another embodiment, the regulation is performed in buck mode when input voltage VIN is significantly greater than the desired output voltage, the regulation is performed in boost mode when input voltage VIN is significantly less than the desired output voltage, and performed in buck-boost mode when input voltage VIN is approximately the same as the desired output voltage.

In any case, switch logic circuit 120 is configured to perform buck-boost PWM regulation such that the buck-boost PWM regulation has at least three distinct phases during each clock pulse of the clock signal. The three phases include: a first phase that occurs between the beginning of the clock pulse and the time that PWM comparator 140 trips, a second phase that occurs between the time that PWM comparator 140 trips and the time that PWM comparator 140 untrips, and a third phase that occurs between the time that PWM comparator 140 untrips and a time that the next clock pulse begins. Accordingly, one and only one pulse-width modulating signal (i.e. signal PWM) is used in the regulation.

The regulation is performed in continuous conduction mode (CCM). During one of the three phases (the first, the second, or the third), the inductor in block 110 is charged. In one embodiment, the inductor charging time is linearly proportional to the magnitude of error signal Err. However, the invention is not so limited, and in some embodiments the inductor charging time is not linearly proportional to the magnitude of error signal Err. During another of the three phases, the inductor in block 110 is discharged. During the remaining of the three phases, the inductor in block 110 is maintained at a roughly constant non-zero value.

Figure 2:
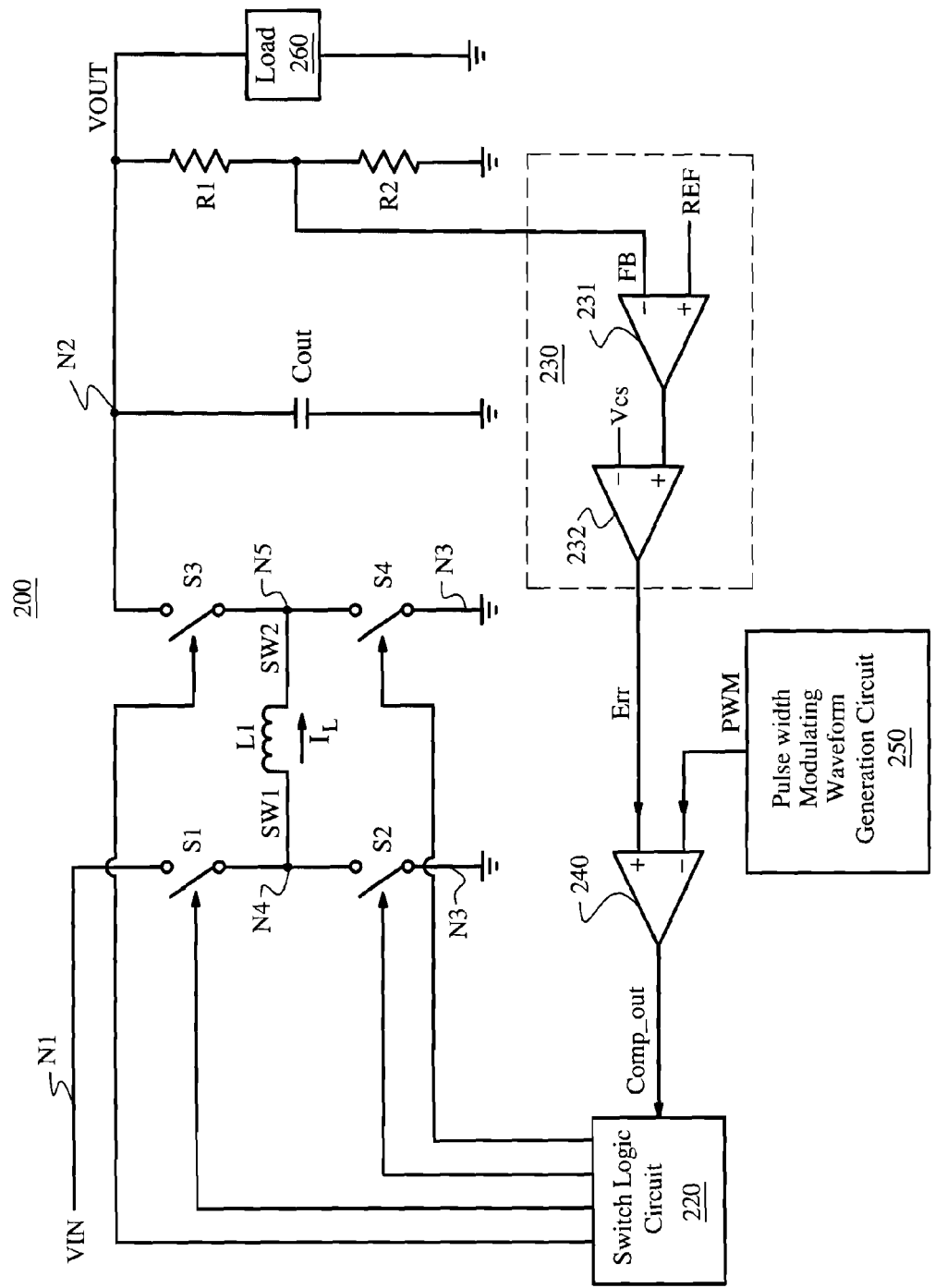
FIG. 2 shows a block diagram of a current-mode embodiment of the converter of FIG. 1.

FIG. 2 shows a block diagram of a current-mode embodiment of converter 200, which is an embodiment of converter 100 of FIG. 1. Converter 200 further includes pulse width modulating waveform generation circuit 250. Error circuit 230 includes error amplifier 231, and amplifier 232. Converter 200 includes switches S1-S4, inductor L1, output capacitor Cout, resistors R1 and R2, and load 260, which correspond to components of an embodiment of block 110 of FIG. 1.

In one embodiment, as illustrated in FIG. 2, the switches S1-S4 and inductor L1 are arranged as follows. Switch S1 is coupled between input node N1 and first inductor node N4. Switch S2 is coupled between first inductor node N4 and ground node N3. Switch S3 is coupled between output voltage node N2 and second inductor node N5. Switch S4 is coupled between second inductor node N5 and ground node N3. Inductor L1 is coupled between first inductor node N4 and second inductor node N5.

Figure 4:
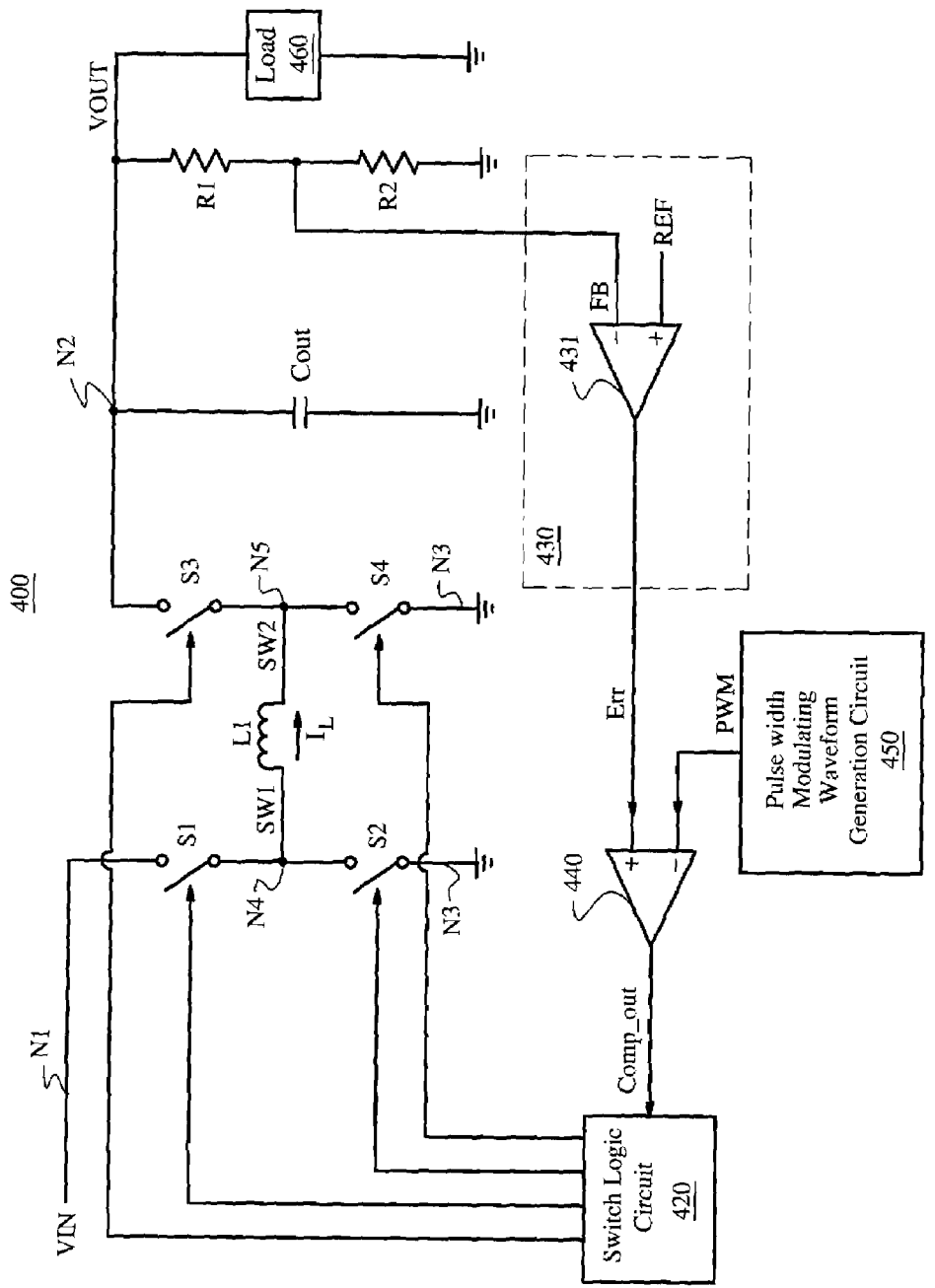
FIG. 4 shows a block diagram of a voltage-mode embodiment of the converter of FIG. 1.

Resistors R1 and R2 operate as a voltage divider to provide feedback signal FB from output voltage VOUT. In the embodiment shown in FIG. 2, error circuit 230 is an embodiment of an error circuit for current-mode regulation. In other embodiments, voltage-mode regulation or the like may be performed, as shown in FIG. 4. in one embodiment. Additionally, error circuit 230 includes compensation not shown in FIG. 2. In one embodiment, error amp 231 and amplifier 232 are both gm amplifiers. Current sense voltage Vcs may be provided in different way in different embodiments, such as through a sense resistor, sense transistor, DCR sensing, or the like.

In any case, pulse width modulating waveform generation circuit 250 is configured to provide signal PWM. In one embodiment, signal PWM is a triangle wave having a substantially constant frequency throughout buck-boost mode. In one embodiment, the same signal PWM is also used in buck and boost modes. For example, in one embodiment, a triangle waveform is used for pulse-width modulating signal PWM, and the signal is unchanged regardless of whether buck, boost, or buck-boost mode is being performed. In another embodiment, the PWM signal is a triangle wave during buck-boost mode, and the PWM signal is dynamically changed to a sawtooth wave during buck mode or boost mode.

As discussed above, in one embodiment, the regulation is always performed in buck-boost mode. In another embodiment, the regulation is performed in buck mode when input voltage VIN is significantly greater than the desired output voltage, the regulation is performed in boost mode when input voltage VIN is significantly less than the desired output voltage, and performed in buck-boost mode when input voltage VIN is approximately the same as the desired output voltage. In this embodiment, throughout buck mode, switch S3 remains closed, switch S4 remains opens, and switches S1 and S2 switch based on signal Comp_out. Conversely, in this embodiment, throughout boost mode, switch S1 remains closed, switch S2 remains open, and switches S3 and S4 switch based on signal Comp_out.

Figure 3:
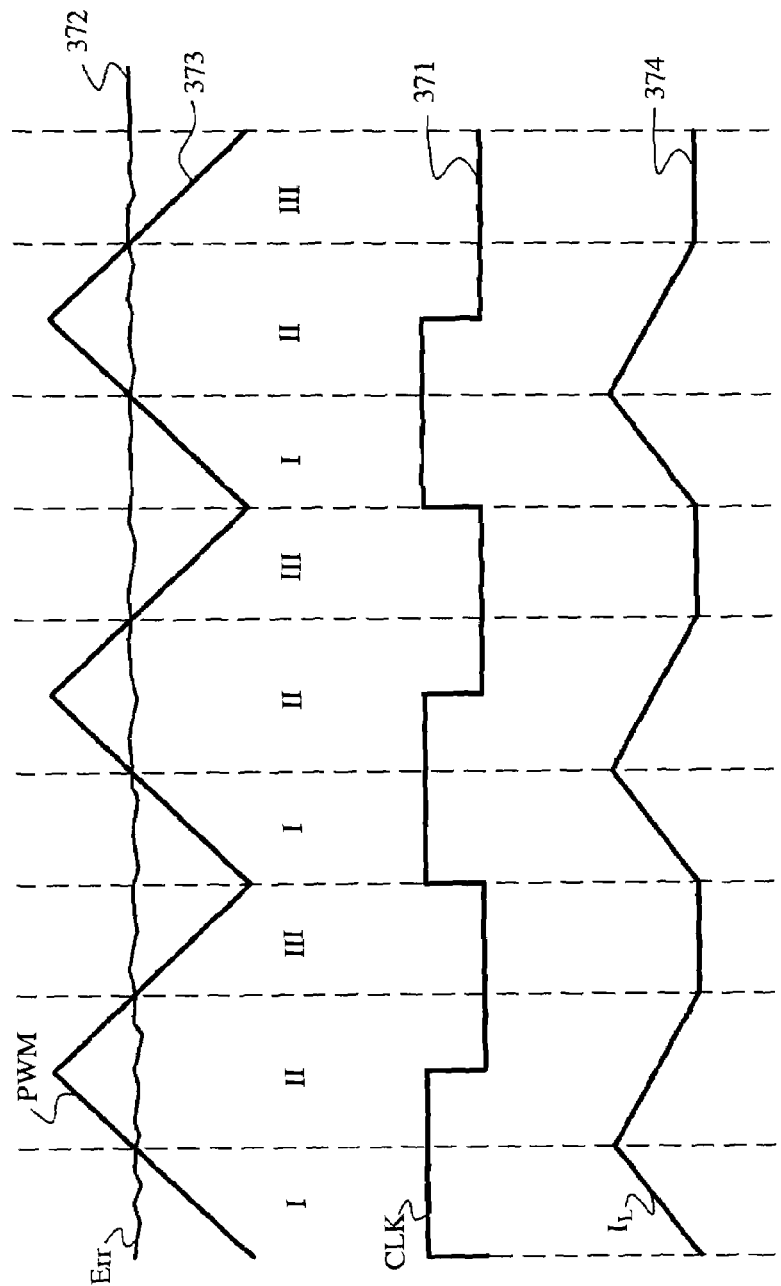
FIG. 3 illustrates timing diagrams of waveforms of embodiments of signals for an embodiment of the converter of FIG. 2.

In one embodiment, buck-boost mode is performed as illustrated in FIG. 3.

FIG. 3 illustrates timing diagrams of waveforms 371, 372, 373, and 374 of embodiments of signals CLK, PWM, Err, and $I_L$ respectively for an embodiment of converter 200 of FIG. 2.

For each cycle of clock signal CLK, there are three phases, I, II, and III. Phase I occurs from the beginning of clock signal, until signal PWM exceeds signal Err. Phase II occurs during the time at which signal PWM exceeds signal Err. Phase III occurs from the second time that signal PWM intersects signal Err, until the next clock cycle begins. As shown in FIG. 3, the start of the clock pulse is synchronized with the start of signal PWM. In one embodiment, signal Err is constrained to operate between the minimum and maximum values of signal PWM.

During one of the three phases, (I, II, or III), inductor current $I_L$ is charged by closing switches S1 and S4 and opening switches S2 and S3. During one of the three phases, inductor current $I_L$ is discharged by closing switches S2 and S3 and opening switches S1 and S4. During one of the three phases, inductor current $I_L$ remains at roughly the same, non-zero value by closing switches S1 and S2 and opening switches S3 and S4. Any order may be used, giving six possible permutations in this example. In four of the six permutations, the inductor charging time is linearly proportional to magnitude of error signal Err. It is preferable to charge the inductor in phase I or III rather than phase II so that inductor time is linearly proportional to the magnitude of error signal Err; however, the invention is not so limited, and phase II may be used to charge the inductor in some embodiment.

One of the six permutations is illustrated in FIG. 3. In this embodiment, during region I, switches S1 and S4 are closed and switches S2 and S3 are open to charge inductor L1, causing current $I_L$ to ramp upward. During region II, switches S2 and S3 are closed and switches S1 and S4 are open to discharge inductor L1, causing current $I_L$ to ramp downward. And during phase III, switches S1 and S2 are closed and switches S3 and S4 are open, causing current $I_L$ remains at roughly the same value.

The embodiment described enables a relatively low peak-peak ripple to average current ratio, which enables a relatively high operating efficiency in buck-boost mode. Also, the embodiment enables the inductor size to be relatively small for a given inductor ripple current and output ripple voltage. Further, the embodiment uses only one pulse width modulating signal and therefore uses less silicon die area and quiescent current than a scheme that uses two pulse width modulating signals.

In one embodiment, the triangle wave is symmetrical, so that phase I and phase III have approximately the same duration. However, the invention is not so limited, and the triangle wave may be asymmetrical in some embodiments.

Although a particular buck-boost topology is shown in FIG. 2, other topologies may be used in other embodiments. For example, although a one-inductor, one-capacitor topology is illustrated in FIG. 2, in other embodiments, a two-inductor, two-capacitor buck-boost topology may be employed instead. Additionally, although a current-mode embodiment is illustrated in FIG. 2, in other embodiments, a voltage-mode embodiment (as shown in FIG. 4 below), or the like, may employed. Further, although a three-phase embodiment is illustrated and described, in other embodiment, more than three phases may be used. For example, a phase in which S3 and S4 are closed and S1 and S2 are open may be used under certain conditions, such as an over-current condition, in some embodiments. Also, more than three phases could be used when transitioning between buck-boost mode and another mode, or vice versa. Further, although FIG. 2 shows a voltage divider being used to provide the feedback signal from the output voltage, the feedback may be provided in other ways. For example, in one embodiment, the output voltage itself may be used as the feedback signal. These embodiments and others are within the scope and spirit of the invention.

FIG. 4 shows a block diagram of a converter 400, which is a voltage-mode embodiment of converter 200 of FIG. 2.

Figure 5:
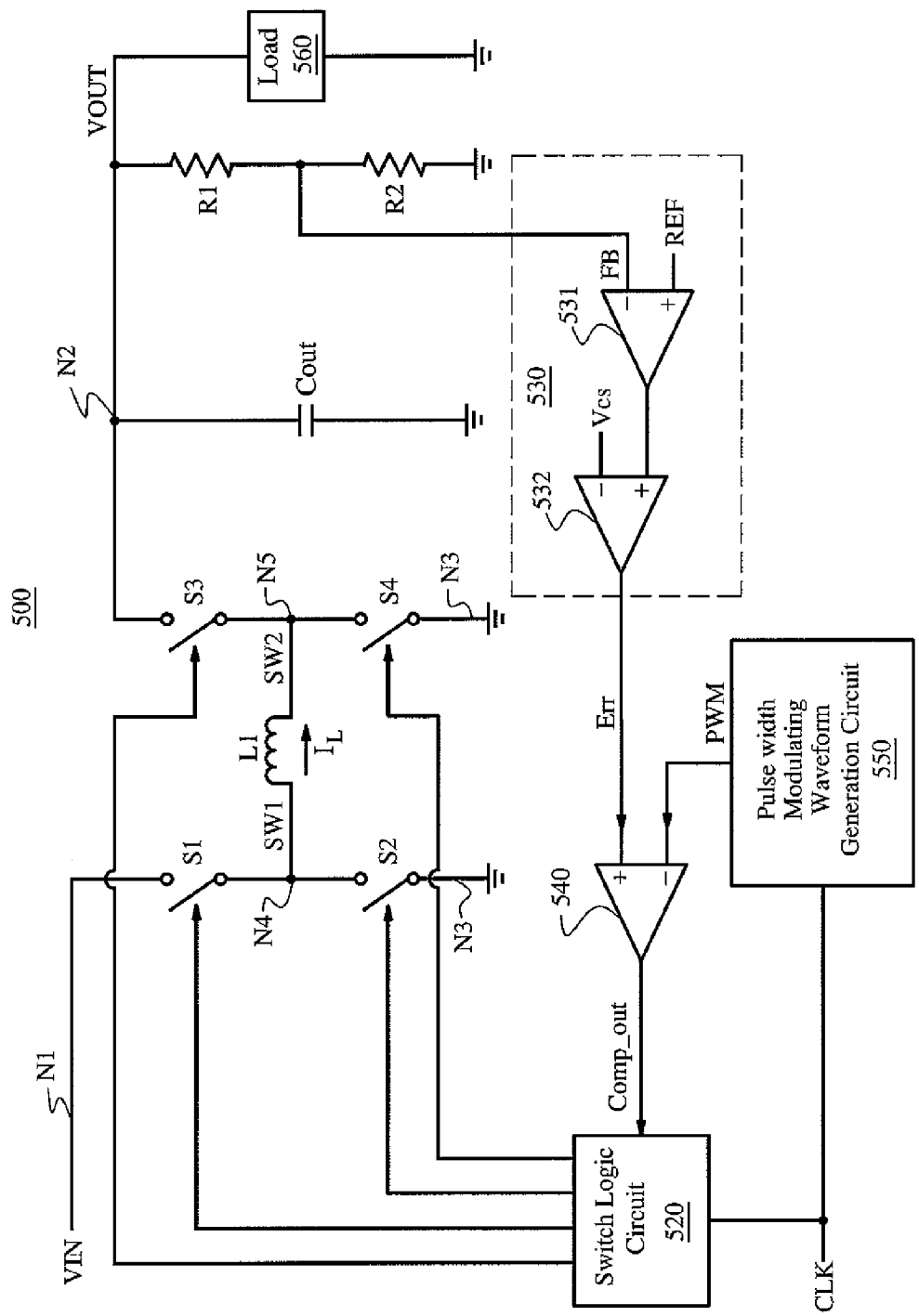
FIG. 5 shows a block diagram of an embodiment of the converter of FIG. 2, arranged in accordance with aspects of the invention.

FIG. 5 shows a block diagram of converter 500, which is an embodiment of converter 200 of FIG. 2 in which switch logic circuit 520 and pulse width modulating waveform generation circuit 550 receive clock signal CLK.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for DC-DC conversion, comprising:
an error circuit that is arranged to receive a feedback signal that is based, in part, on at least one of an output voltage or a load current; and to provide an error signal that is based, at least in part, on the feedback signal;
a comparator that is arranged to compare the error signal with a pulse width modulating signal, and to provide a comparator output signal based on the comparison;
a switch control logic circuit that is arranged to receive the comparator output signal, wherein the switch control logic circuit is arranged to receive a clock signal, and wherein the switch control logic circuit is configured to control a plurality of switches such that:
at least when the input voltage is relatively close to a pre-determined voltage, the switches are controlled such that buck-boost mode PWM regulation is performed;
the buck-boost PWM regulation has three distinct phases during each clock pulse of the clock signal, wherein the three phases include: a first phase that occurs between the beginning of the clock pulse and the time that the comparator trips, a second phase that occurs between the time that the comparator trips and the time that the comparator untrips, and a third phase that occurs between the time that the comparator untrips and a time that the next clock pulse begins;
during one of the three phases, an inductor current is charged;
during another of the three phases, the inductor current is discharged; and
during yet another of the three phases, the inductor current is maintained at a roughly constant, non-zero value.

2. The circuit of claim 1, wherein the switch control logic circuit is configured to control the plurality of switches such that the inductor current is charged during the first phase, the inductor current is discharged during the second phase, and the inductor current is maintained at the roughly constant, non-zero value during the third phase.

3. The circuit of claim 1, wherein the switch control logic circuit is configured to control the plurality of switches such that the inductor current is charged during the third phase, the inductor current is discharged during the second phase, and the inductor current is maintained at the roughly constant, non-zero value during the first phase.

4. A circuit for DC-DC conversion, comprising:
a buck-boost PWM regulator controller that is configured to: control PWM regulation to regulate an output voltage; control the PWM regulation in buck-boost mode at least when an input voltage is relatively close to a pre-determined voltage; and to control the PWM regulation in buck-boost mode such that: exactly one pulse width modulating signal is used in a pulse width modulation of the PWM regulation in buck-boost mode, the PWM regulation in buck-boost mode operates according to at least three distinct phases per clock cycle of a clock signal, and such that the PWM regulation in buck-boost mode is performed in current conduction mode; and
a pulse width modulating waveform generation circuit that is configured to provide the exactly one pulse width modulating signal such that, during buck-boost mode, a frequency of the exactly one pulse width modulation signal is approximately constant.

5. The circuit of claim 4, wherein the buck-boost PWM controller is configured to control the PWM regulation such that the PWM regulation occurs in buck-boost mode regardless of the value of the input voltage.

6. The circuit of claim 4, wherein the buck-boost PWM controller is configured to operate in buck mode if the input voltage is significantly greater than the pre-determined voltage, and wherein the buck-boost PWM controller is configured to operate in boost mode if the input voltage is significantly less than the pre-determined voltage.

7. The circuit of claim 4, wherein the pulse width modulation waveform generation circuit is operable to provide the exactly one pulse width modulating signal such that the exactly one pulse width modulating signal is a triangle wave at least during buck-boost mode.

8. The circuit of claim 7, wherein the pulse width modulation waveform generation circuit is configured to provide the pulse width modulating signal such that a start of each triangle of the triangle wave is synchronized with the start of each clock cycle of the clock signal.

9. The circuit of claim 7, wherein the pulse width modulation waveform generation circuit is operable to provide the exactly one pulse width modulating signal such that the exactly one pulse width modulating signal is a symmetrical triangle wave at least during buck-boost mode.

10. The circuit of claim 4, further comprising the plurality of switches, wherein the plurality of switches include:
a first switch that is coupled between an input voltage node and a first inductor node, wherein the first switch is arranged to receive the input voltage at the input voltage node;
a second switch that is coupled between the first inductor node and a ground node;
a third switch that is coupled between an output voltage node and a second inductor node, wherein the output voltage is provided at the output voltage node; and
a fourth switch that is coupled between the second inductor node and the ground node.

11. The circuit of claim 4,
wherein the buck-boost PWM controller includes:
a comparator that is arranged to compare an error signal with the exactly one pulse width modulating signal, and to provide a comparator output signal based on the comparison.

12. The circuit of claim 11,
wherein the buck-boost PWM controller further includes:
a switch control logic circuit that is arranged to receive the comparator output signal, and to control the PWM regulation based, at least in part, on the comparator output signal.

13. The circuit of claim 12, wherein the switch control logic circuit is configured to control the PWM regulation such that the at least three phases per clock cycle include: a first phase that occurs between the beginning of the clock pulse and the time that the comparator trips, a second phase that occurs between the time that the comparator trips and the time that the comparator untrips, and a third phase that occurs between the time that the comparator untrips and a time that the next clock pulse begins.

14. The circuit of claim 11,
wherein the buck-boost PWM controller further includes:
an error circuit that is operable to provide the error signal, wherein the error circuit includes an error amplifier.

15. The circuit of claim 4,
wherein the buck-boost PWM controller includes:
an error circuit that is arranged to receive a feedback signal that is based, in part, on at least one of the output voltage or a load current; and to provide an error signal that is based, at least in part, on the feedback signal, wherein an inductor is charged during one of the three distinct phases per clock cycle such that the inductor charging time is linearly proportional to a magnitude of the error signal.

16. A circuit for DC-DC conversion, comprising:
a buck-boost PWM regulator controller that is configured to: control PWM regulation to regulate an output voltage; control the PWM regulation in buck-boost mode at least when an input voltage is relatively close to a predetermined voltage; and to control the PWM regulation in buck-boost mode such that: exactly one pulse width modulating signal is used in a pulse width modulation of the PWM regulation in buck-boost mode, the PWM regulation in buck-boost mode operates according to at least three distinct phases per clock cycle of a clock signal, and such that the PWM regulation in buck-boost mode is performed in current conduction mode;
a pulse width modulating waveform generation circuit that is configured to provide the exactly one pulse width modulating signal such that, during buck-boost mode, a frequency of the exactly one pulse width modulation signal is approximately constant; and
the plurality of switches, wherein the plurality of switches include:
a first switch that is coupled between an input voltage node and a first inductor node, wherein the first switch is arranged to receive the input voltage at the input voltage node;
a second switch that is coupled between the first inductor node and a ground node;
a third switch that is coupled between an output voltage node and a second inductor node, wherein the output voltage is provided at the output voltage node; and
a fourth switch that is coupled between the second inductor node and the ground node, wherein the buck-boost PWM regulator is configured to control the plurality of switches such that:
during one of the at least three distinct phases per clock cycle, the first switch is closed, the second switch is open, the third switch is open, and the fourth switch is closed, such that an inductor charges;
during another of the at least three distinct phases per clock cycle, the first switch is open, the second switch is closed, the third switch is closed, and the fourth switch is open, such that the inductor discharges; and
during yet another of the three distinct phases per clock cycle, the first switch is closed, the second switch is closed, the third switch is open, and the fourth switch is open.

17. A method for DC-DC conversion, comprising:
providing an error signal that is based, at least in part, on at least one of an output voltage or a load current;
providing a pulse width modulating signal having an approximately constant frequency;
comparing the error signal with the pulse width modulating signal;
regulating the output voltage such that, during a buck-boost mode, the regulation occurs according at least three phases per clock cycle, wherein regulating the output voltage during buck-boost mode includes:
determining when each of the at least three phases per clock cycle occurs based, at least in part, on the comparison of the error signal with the pulse width modulating signal;
during one of the three phases per clock cycle, charging an inductor current;
during another of the three phases per clock cycle, discharging the inductor current; and
during yet another of the three phases per clock cycle, maintaining the inductor current at a roughly constant, non-zero value.

18. The method of claim 17, wherein providing the pulse width modulating signal is accomplished such that the pulse width modulating signal is a triangle wave at least during buck-boost mode.

19. The method of claim 17,
wherein determining when each of the at least three phases per clock cycle occurs is accomplished such that a first phase of the at least three phases phase occurs between the beginning of the clock pulse and the time that the comparator trips, a second phase of the at least three phases occurs between the time that the comparator trips and the time that the comparator untrips, and a third phase of the at least three phases occurs between the time that the comparator untrips and a time that the next clock cycle begins.

20. The method of claim 17,
wherein regulating the output voltage further includes controlling a plurality of switches, wherein the plurality of switches include a first switch that is coupled between the input voltage and a first inductor node, a second switch that is coupled between the first inductor node and a ground node, a third switch that is coupled between the output voltage and a second inductor node, and a fourth switch circuit that is coupled between the second inductor node and the ground node, wherein the inductor is coupled between the first inductor node and the second inductor node, and wherein:
charging the inductor includes closing the first and fourth switches and opening the second and third switches;
discharging the inductor includes opening the first and fourth switches and closing the second and third switches; and
maintaining the inductor current at a roughly constant, non-zero value includes closing the first and second switches and opening the third and fourth switches.

* * * * *